Oct. 7, 1930.  A. HULLEY  1,777,565
SUSPENSION FOR VEHICLES
Filed June 10, 1927
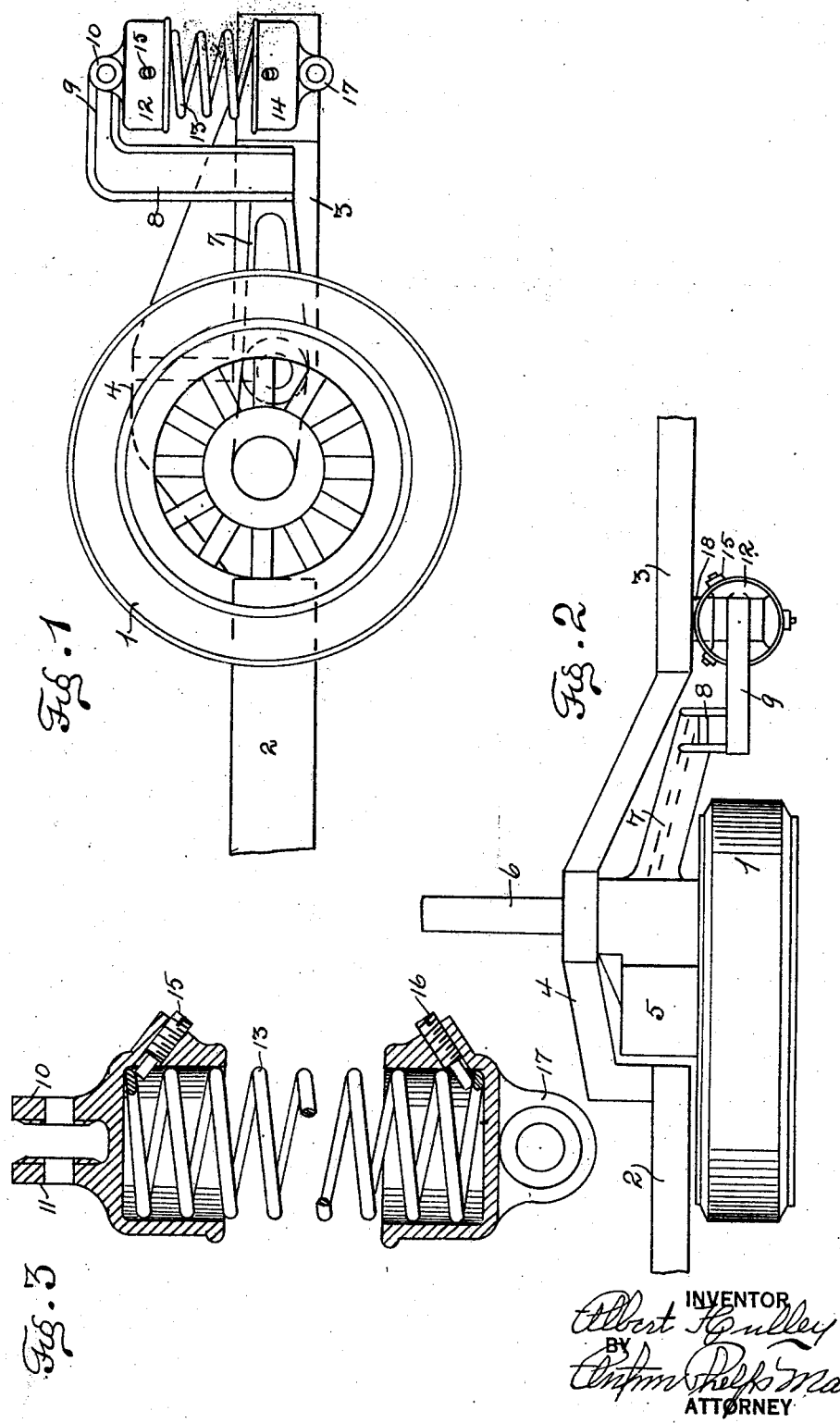

Patented Oct. 7, 1930

1,777,565

UNITED STATES PATENT OFFICE

ALBERT HULLEY, OF NEW YORK, N. Y.

SUSPENSION FOR VEHICLES

Application filed June 10, 1927. Serial No. 197,837.

The device, the subject of this invention is a suspension for vehicles and the object of the invention is to provide a flexible cantilever suspension which while offering the highest degree of resiliency will also provide the necessary firmness and strength to carry any load that may be placed upon it.

While in the development of my device I have constructed it and employed it for use with trailers, I see no reason why it cannot be employed for general use.

Another object of the invention is to provide maximum spring action, thus softening the shock and another object of the invention is to provide a lever action which not only makes possible the increase of spring action, but also allows my device to operate as an efficient snubber, checking the rebound of the vehicle body.

With these objects in view and others that will appear from the development and description of my invention, the following is what I consider the best means of carrying out my invention and the accompanying drawing should be referred to for a complete understanding of the specification which follows.

In the drawing:—

Fig. 1, shows a traction wheel and a single suspension unit.

Fig. 2, is a top plan view of the portion shown in Fig. 1 and

Fig. 3, is an enlarged view, partly in section.

Similar reference numerals indicate like parts in all the figures where they appear.

At 1 I show a traction or load carrying wheel and at 2 and 3 frame portions connected by means of a bridge 4. The wheel 1, in the development here shown, is supported upon a short pin or shaft which enters the housing 5 and is supported thereby and this housing also receives a second shaft 6 arranged parallel with the short shaft upon which the wheel is mounted. This second shaft 6 may extend completely across the vehicle and is suitably supported in the bridge 4 and may be supported in longitudinal struts of the vehicle or other means, not shown.

The shaft 6 need not rotate. The housing 5 is, however, free to partially rotate upon the shaft 6. The housing 5 is provided with a backwardly extending projection 7. A lever supports the armed bracket 8, the arm 9 of which engages between a pair of lugs 10 and 11 formed integral with a cap or cup member 12. Within the cap member 12 I secure a spring 13, the lower end of the spring being received in a second cap or cup member 14 and I provide a plurality of set screws as shown at 15 for securing the spring within the cups 12 and a second plurality of set screws 16 secure the spring within the cup 14. Lugs 17 formed integral with the cap 14 secure this cap to a bracket 18 which is in turn secured to the aft portion 3 of the frame.

It will be noted that the housing 5 and the backwardly extending projection 7 co-operate to form a lever fulcrumed upon the shaft 6, the housing 5 forming the short portion of the lever, therefore any up and down movement of the wheel 1 and its supporting shaft will, through the housing 5, be transmitted to the frame 7 and thus through the bracket 8 and cap 12 to the spring 13. This spring should be of sufficient strength to support any load placed upon the body or frame of the vehicle, as the vehicle body or frame is suspended by the bracket 18 to the lower cap 14.

I have only shown a small portion of a vehicle. It will, however, be understood that ordinarily four devices such as I have described will be employed, one adjacent each wheel.

It will further be understood that the size of each and every part may be changed and will be changed to meet the varying conditions under which my device will be required to operate and modifications may be made within the scope of the appended claims, without departing from the principle or sacrificing advantages of the invention.

Having carefully and fully described my invention, what I claim and desire to obtain is:—

1. A suspension for vehicles comprising a vertically disposed depression spring, a cup member at each end of said spring a vertical arm secured in the uppermost cup member, a lever secured to the other end of said arm, a fulcrum for said lever and means for connecting said lever to the wheel shaft of a vehicle, a frame having an extension and means for securing the other said cup member to said extension.

2. A suspension for vehicles comprising a frame, a bridge in said frame, a shaft supported by said bridge, a lever fulcrumed upon said shaft and a wheel shaft in one end of said lever and by which one traction wheel is supported, an upwardly extending arm secured to the other end of said lever and a spring member secured to said arm and operated thereby, one end of said spring member being secured to said frame.

3. A suspension for vehicles comprising a frame in two parts, a bridge connecting said parts, a fulcrum pin supported in one of said parts, a lever upon said fulcrum pin and a pin carried at one end of said lever for supporting a traction wheel, an L shaped arm secured to the other end of said lever and a spring between said L shaped arm and the frame member, and means for securing said spring to the arm and to the frame member.

4. A suspension for motor vehicles comprising a frame in two parts, an arched member securing said parts together, a fulcrum pin supported in one part of said frame, and in line with the other part of said frame, a lever upon said fulcrum pin and a pin carried by said lever for supporting a traction wheel in a position approximately upon the level of said frame members and a spring member arranged between the other end of said lever and the frame member and adapted to provide resiliency for the traction wheel.

Signed at the city, county and State of New York, this 9th day of June, 1927.

ALBERT HULLEY.